US012048994B1

(12) United States Patent
Sanders

(10) Patent No.: US 12,048,994 B1
(45) Date of Patent: Jul. 30, 2024

(54) BREACHING TOOL

(71) Applicant: Jeremy Michael Sanders, Moro, IL (US)

(72) Inventor: Jeremy Michael Sanders, Moro, IL (US)

( * ) Notice: Subject to any disclaimer, the term of this patent is extended or adjusted under 35 U.S.C. 154(b) by 185 days.

(21) Appl. No.: 17/893,080

(22) Filed: Aug. 2, 2022

Related U.S. Application Data

(60) Provisional application No. 63/236,251, filed on Aug. 24, 2021.

(51) Int. Cl.
*B25D 9/11* (2006.01)
*B25D 17/02* (2006.01)

(52) U.S. Cl.
CPC ................ *B25D 9/11* (2013.01); *B25D 17/02* (2013.01)

(58) Field of Classification Search
CPC .................................. B25D 9/11; B25D 17/02
See application file for complete search history.

(56) References Cited

U.S. PATENT DOCUMENTS 2,848,915 A 8/1958 Aitken et al.
4,068,790 A * 1/1978 Osterle ..................... B25C 1/18 227/8
5,119,634 A * 6/1992 Berry ...................... B25C 1/143 60/632
5,237,613 A 8/1993 Berry et al.
5,465,893 A * 11/1995 Thompson .............. B25C 1/188 227/8
6,318,228 B1 * 11/2001 Thompson ............. A62B 3/005 173/90
6,564,688 B2 * 5/2003 Sabates .................... A22B 3/02 89/1.14
6,631,668 B1 * 10/2003 Wilson ..................... B25D 9/10 89/1.14
6,889,591 B2 * 5/2005 Sabates .................. A62B 3/005 173/90
7,814,822 B2 10/2010 Brennan et al.
8,342,069 B2 1/2013 Brennan et al.
8,418,592 B1 4/2013 Gonstad et al.
10,946,222 B2 3/2021 Hansen et al.
2013/0160342 A1 7/2013 Melton
2021/0101030 A1 4/2021 Schnell

* cited by examiner

*Primary Examiner* — Michelle Clement
(74) *Attorney, Agent, or Firm* — CreatiVenture Law, LLC; Dennis J M Donahue, III

(57) ABSTRACT

A breaching tool is powered by a blank cartridge in a breaching gun and includes a barrel, a propulsion assembly in the barrel, and a spring assembly around the barrel. When the cartridge is discharged in a chamber in fluid communication with the barrel's bore, pressure produced by the discharged cartridge propels the propulsion assembly forward from a ready position to an extended position, forcing a ramming head forward. The spring assembly has a compression spring in a spring can that biases the assemblies and ramming head back to the ready position. The breaching tool also includes a handguard that extends over and past the barrel's proximal half and surrounds a rear portion of the spring can. When used with a semiautomatic breaching gun, the breaching tool includes gas block over a gas port in the barrel, and a gas tube extends back to the breaching gun's bolt carrier group.

20 Claims, 8 Drawing Sheets

BREACHING TOOL

CROSS-REFERENCE TO RELATED APPLICATIONS

This application claims priority to U.S. Provisional Pat. App. No. 63/236,251 filed on Aug. 24, 2021 which is incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to breaching tools, and more particularly to a modified breaching tool which utilizes a semiautomatic receiver and novel propulsion assembly to force the ramming head forward.

Related Art

Breaching tools are known in the prior art, particularly breaching tools that use the force from a discharged blank cartridge in a combustion chamber to actuate the breaching action by propelling the breaching tool forward. However, many of these breaching tools with a breaching gun power source do not use semiautomatic receivers and instead may use systems more akin to revolvers or manual bolt action rifles. In contrast to many of these prior art references, it would be beneficial to use the mechanisms that are found in semiautomatic rifles, such as the AR-15 firearm, either using or adapting the upper receiver and lower receiver of these semiautomatic rifles or variations thereof to load new blank cartridges using power generated by the discharged blank cartridge rather than requiring manual action by the user. In addition, it would be beneficial to provide a barrel configuration which keeps the propulsion assembly moving along a fixed linear axis aligned with the barrel axis.

Examples of prior art breaching tools that incorporate components of firearms to harness the force of the discharged blank cartridge in a combustion chamber are documented in U.S. Pat. Nos. 10,946,222, 8,418,592 and US Pat. App. Pub. No. 2013/0160342 which are incorporated by reference herein. The '222 Patent describes a breaching tool that uses a revolver style receiver. Similarly, the '592 Patent and '342 Application use a rifle style receiver with manual reloading operations rather than a semiautomatic operation, and consequently, they do not possess the capability to automatically eject blank shells and load fresh blanks. The '592 Patent discloses a pump action loading mechanism similar to a shotgun. The breaching tool disclosed in U.S. Pat. No. 8,342,069, and which is also incorporated by reference herein, has a manual bolt action loading mechanism. Although the '069 Patent suggests that semiautomatic configuration is also possible, does not explain how the semiautomatic mechanisms which are designed for a firearm would be modified to be used with the breaching tool. A semiautomatic receiver would improve on these tools' capabilities by allowing a user to breach a structure without needing to manually load and unload blank rounds, which consumes more time and effort; instead the tool performs this action automatically.

Known breaching tools that use semiautomatic receivers, such as US Pub. No. 2021/0101030 which is incorporated by reference herein, have the capability to load and discharge blank rounds, however, there lies room for improvement on the references' ability to efficiently distribute the breaching force on the ramming head, which is the primary breaching component that must physically impound on a structure, to quickly break tempered glass. In the '030 Application, the tool equally distributes the force of the breaching impact amongst all of the projections on its ramming head, which could fail to breach a structure with an initial hit and necessitates more breaching attempts, and as a result, more of the user's time. In addition, the configuration of the angles of the knife edges on the ramming head of the '030 Application's tool prevent the tool from severing the gel located in between the two panes of tempered glass found in hurricane-style laminated glass.

Accordingly, there remains a need for a semi-automatic breaching tool with an improved ramming head design that can more efficiently cut through tempered glass. Particularly, the improved breaching tool should have a ramming head that efficiently distributes the force of the breaching impact amongst all the pins while also having a design that does not wear the pins out quickly.

SUMMARY OF THE INVENTION

The invention is a breaching tool that uses the force generated in the chamber of a semiautomatic receiver to push a propulsion assembly forward in a barrel from its ready position to an extended position, forcing a ramming head forward. A portion of the barrel is surrounded by a compression spring which is bordered on one side by a shaft collar fixedly attached to the distal end of the barrel and a spring can that surrounds the compression spring and slides on the barrel on the other side of the compression spring and slides over the shaft collar's outward periphery. The inventive breaching tool is preferably paired with an upper receiver, a lower receiver, and a shoulder stock assembly that are modified from a standard semiautomatic rifle.

The breaching tool can be used with standard ramming heads or innovative ramming heads that perform specialized functions such as breaking through hurricane glass.

Further areas of applicability of the present invention will become apparent from the detailed description provided hereinafter. It should be understood that the detailed description explains the features and functionality of the preferred embodiment of the invention and some alternative examples which are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
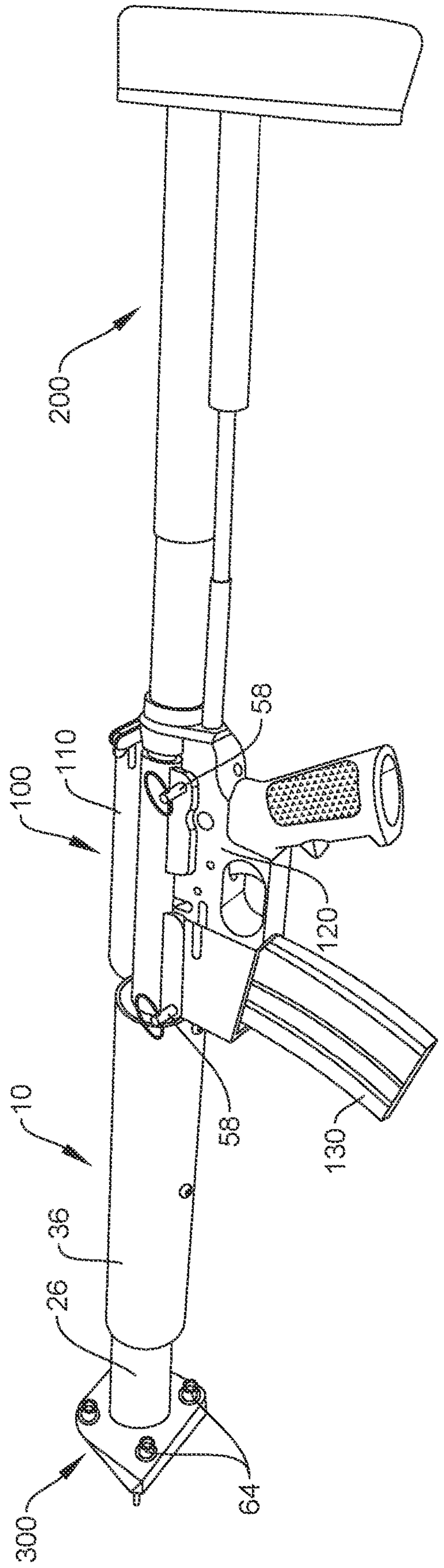
FIGS. 1A and 1B are perspective view of a breaching tool according to the present invention.
Figure 1B:
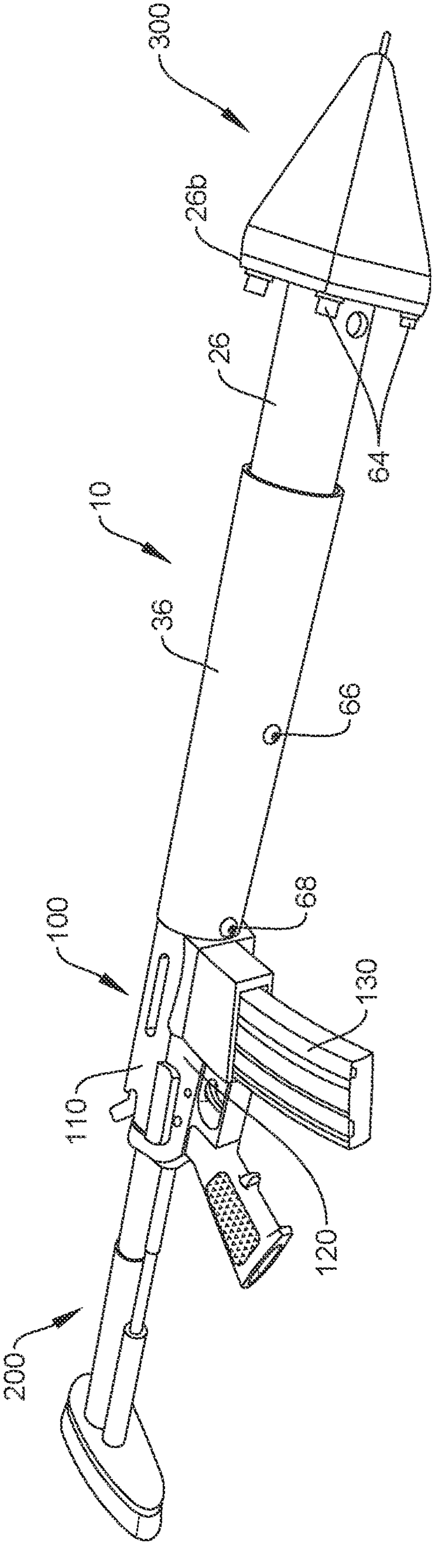
Figure 2A:
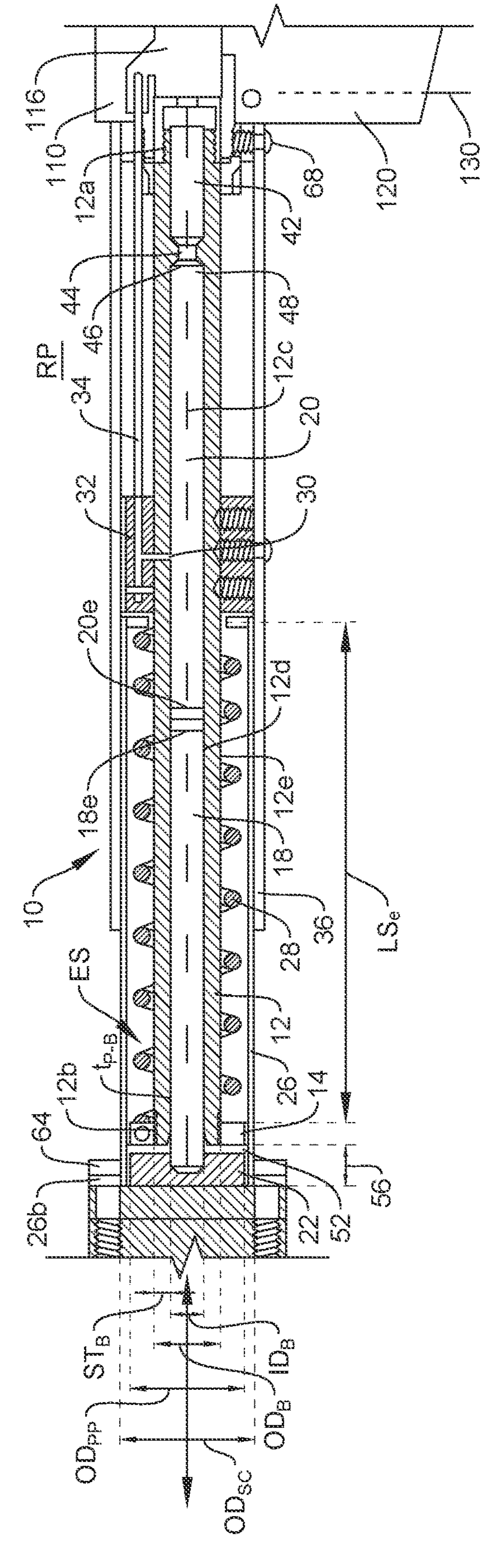
FIGS. 2A and 2B are side cross-sectional views of the working portion of the breaching tool shown in FIGS. 1A and 1B in a ready position and deployed position, respectively.
Figure 2B:
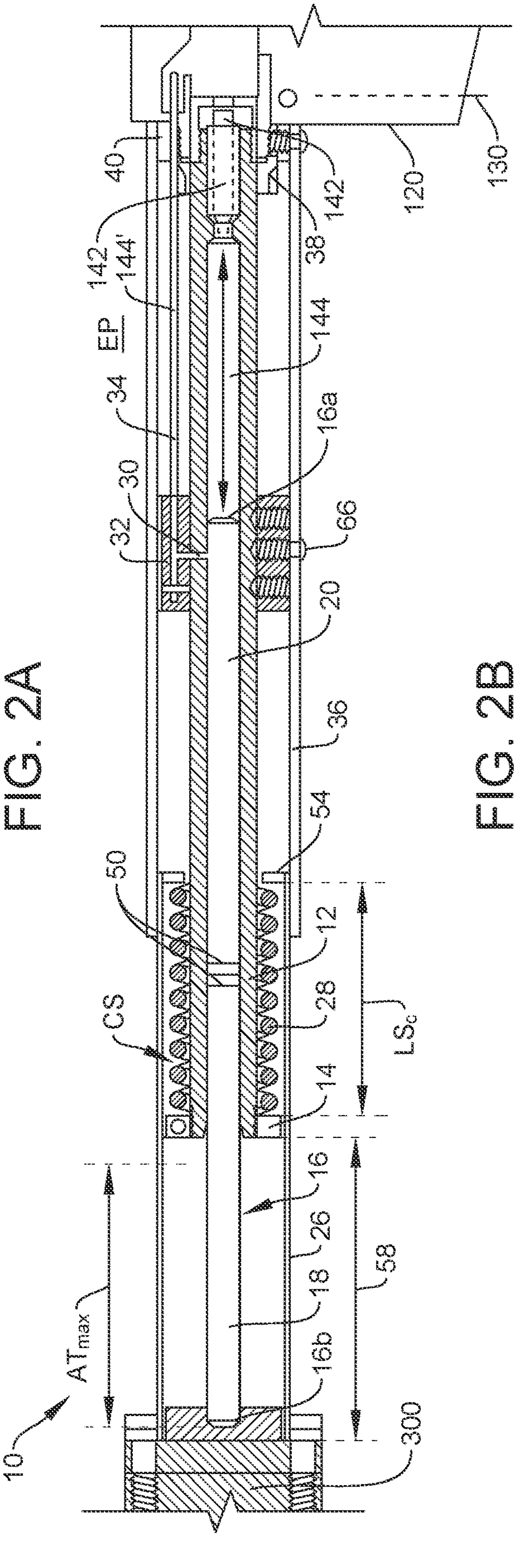
Figure 2C:
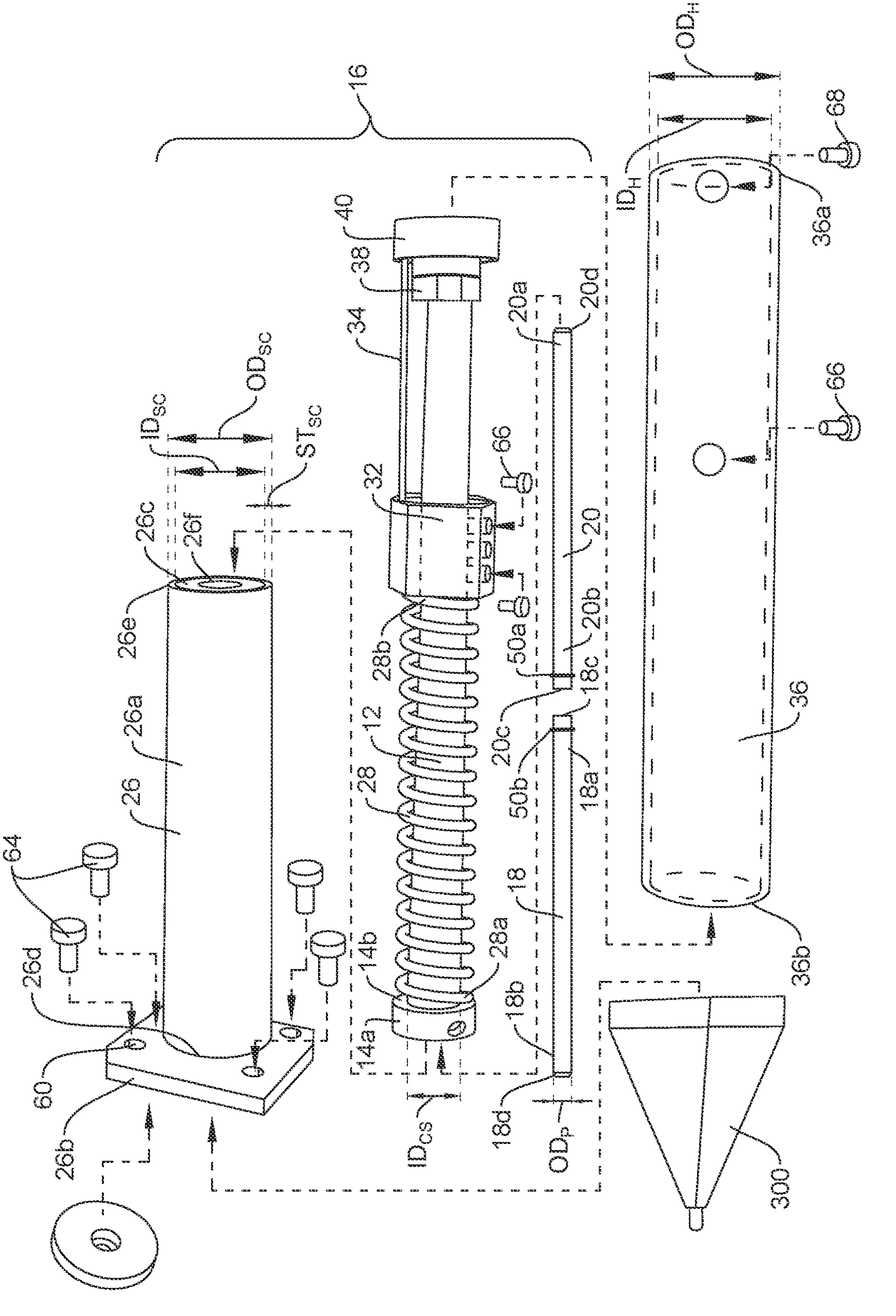
FIG. 2C is an exploded view of the subassemblies and disassembled components for the working portion of the breaching tool shown in FIGS. 2A and 2B.
Figure 3A:
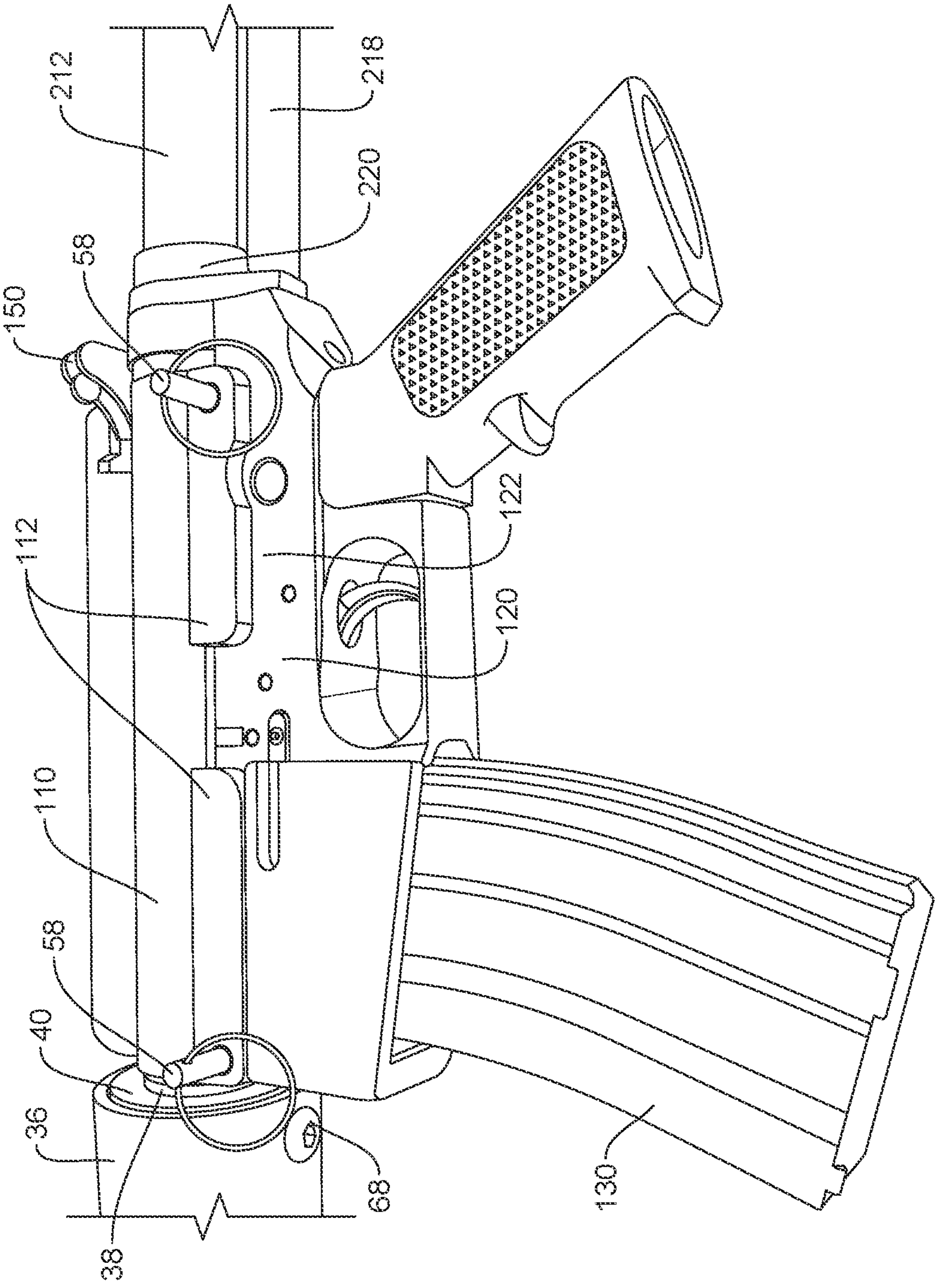
FIG. 3A is a detail side view of the upper receiver, lower receiver, and magazine shown in FIGS. 1A and 1B.
Figure 3B:
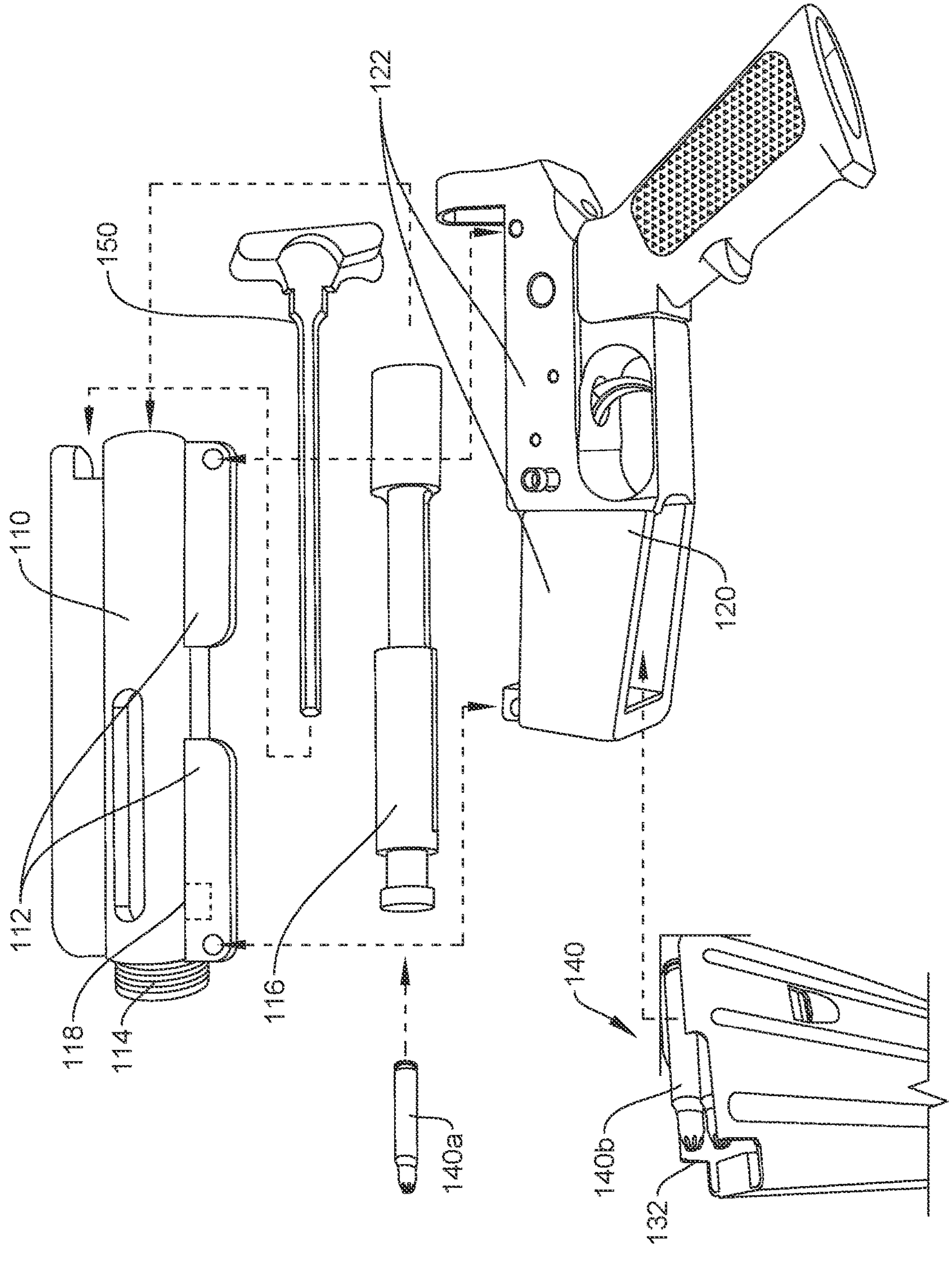
FIG. 3B is an exploded view of the upper receiver, lower receiver, and magazine shown in FIG. 3A.
Figure 4B:
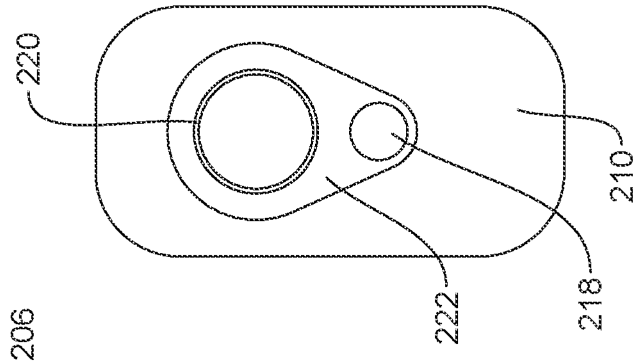
FIGS. 4A and 4B are a side cross-sectional view and a front view, respectively, of the breaching tool's shoulder stock assembly shown in FIGS. 1A and 1B.
Figure 4A:
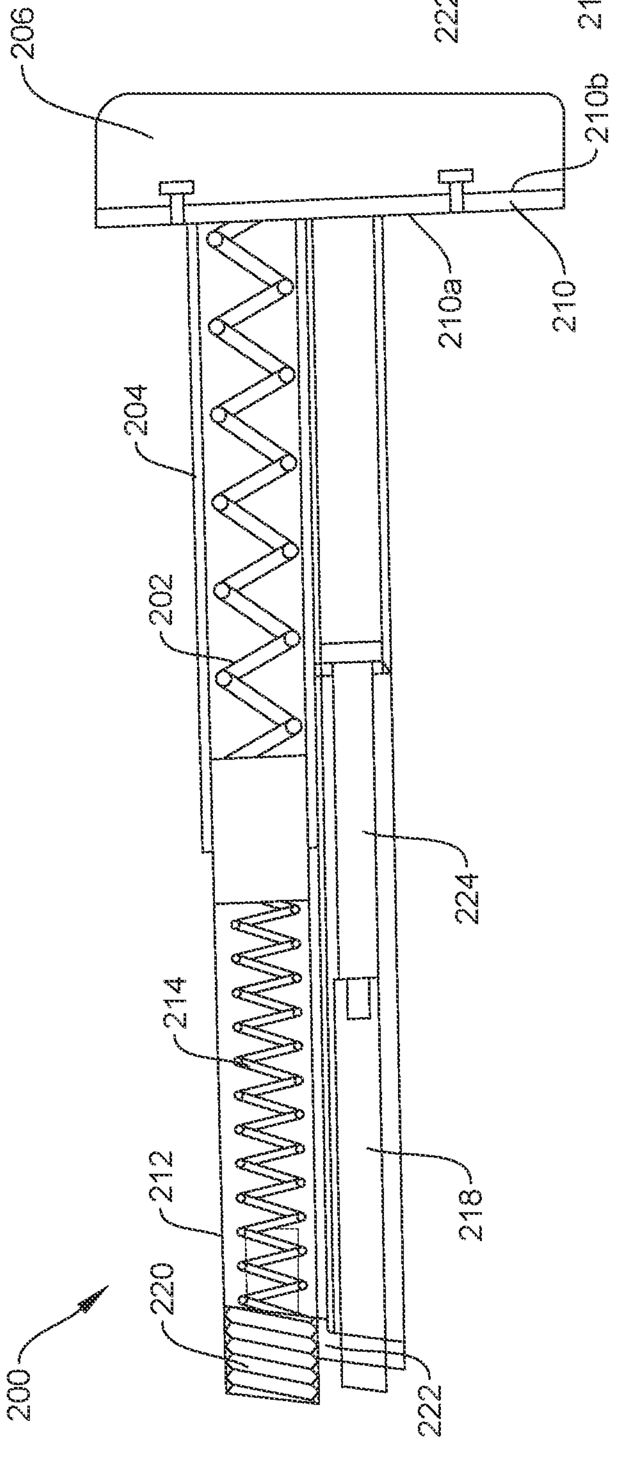
Figure 4C:
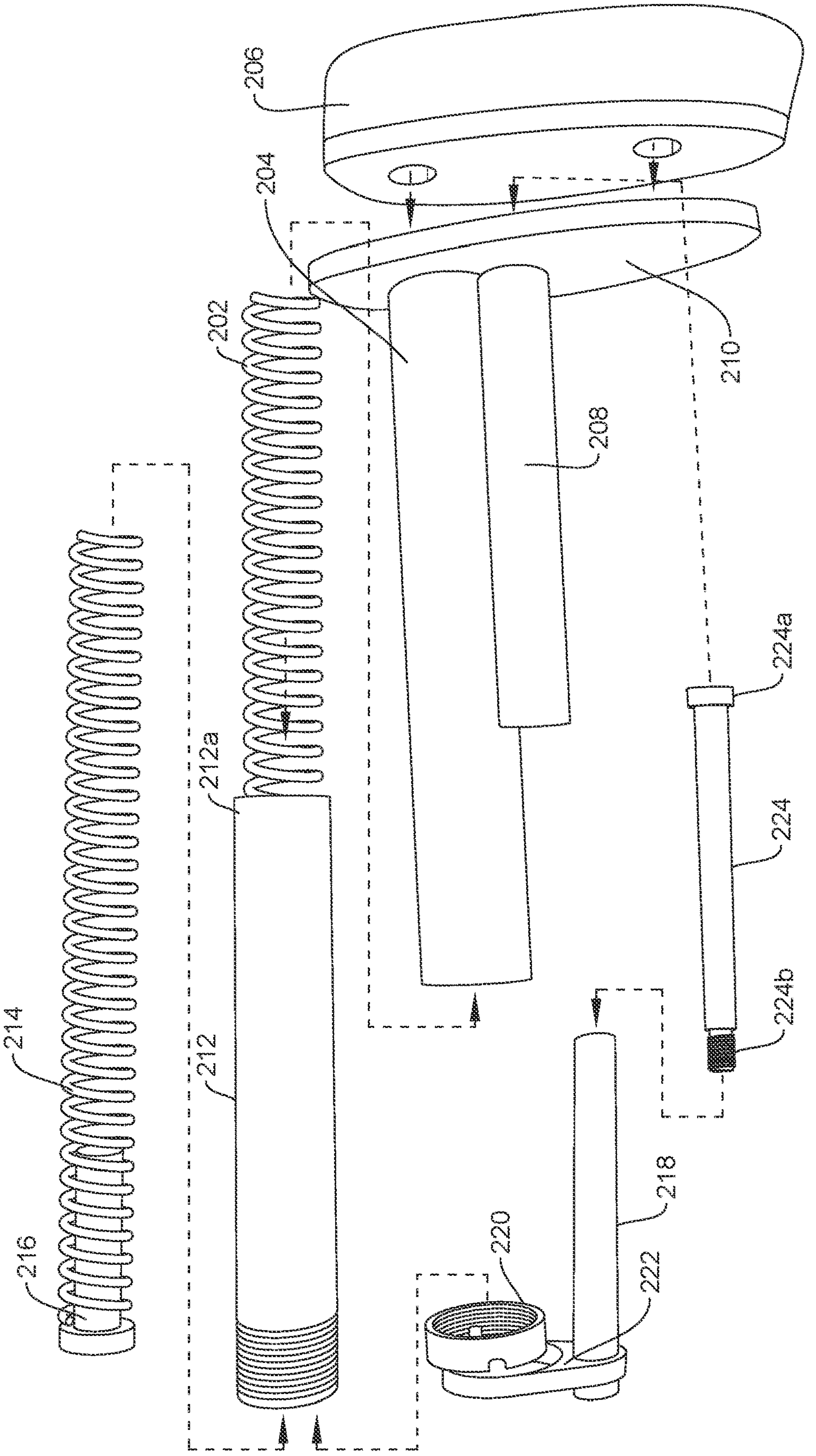
FIG. 4C is an exploded view of the breaching tool's shoulder stock assembly shown in FIG. 4A.
Figure 5C:
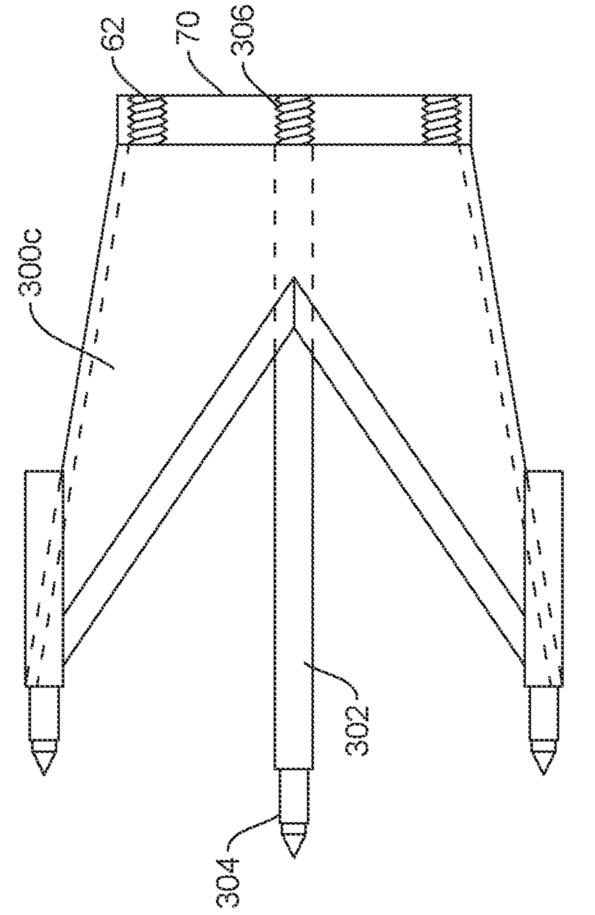
FIGS. 5A, 5B, and 5C are side views of alternative ramming heads and their mounting plates.
Figure 5B:
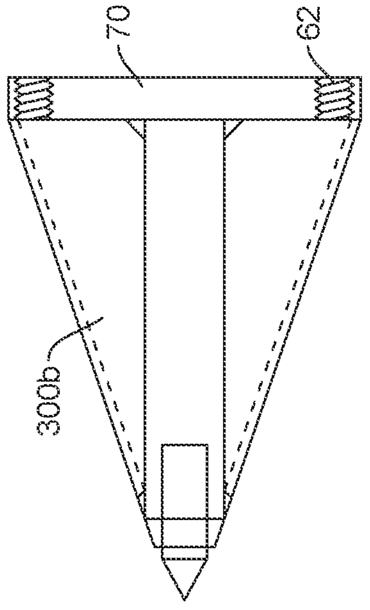
Figure 5A:
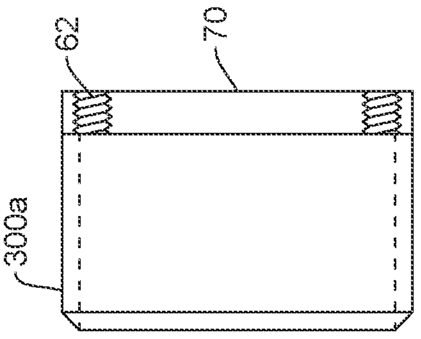

The invention described herein is a breaching tool 10 that is powered by a blank cartridge 140*a* in the chamber 42 of a semiautomatic breaching gun 100 which is generally shown in FIGS. 1A and 1B and is shown in more detail in FIGS. 2A, 2B, and 2C. As shown in FIGS. 3A and 3B, the upper receiver 110 and the lower receiver 120 in the breaching gun are preferably modified to be more sturdy than standard receivers which are used in firearms. The breaching gun also preferably has a modified shoulder stock assembly 200 that provides greater shock absorbing capability than standard shoulder stocks which are used in firearms, and its details are shown in FIGS. 4A and 4B. The breaching tool can use different ramming heads 300 such as shown in FIGS. 5A, 5B, and 5C that are each mounted to a flange located at the distal end of a propulsion assembly 16 that has at least a pushpin 18 that slides within the bore of a barrel 12. As explained in detail below, the propulsion assembly may also include a piston 20 in the barrel's bore between the back end of the pushpin and the chamber for the blank cartridge, one or more o-rings 50 around the pushpin and the piston, and a pushpin plate 22 between the front end of the pushpin and the ramming head. When the blank cartridge is discharged in a chamber in fluid communication with the barrel's bore, the force of the high pressure discharge propels the propulsion assembly forward in the barrel from a ready position (RP) to an extended position (EP), thereby forcing the ramming head forward. After each breaching action, a spring assembly 24 with a spring can 26 and a compression spring 28 biases the propulsion assembly and ramming head back from the extended position to the ready position; the ramming head is preferably mounted to a flange 26*b* at the front edge 26*d* of the spring can's cylindrical housing 26*a*. The breaching tool preferably includes a handguard 36 that extends over the proximal side of the barrel and a rear portion of the spring can.

For semiautomatic operation of the breaching tool, a gas block 32 is mounted to the barrel 12 over a gas port 30, and a gas tube 34 provides a passageway for fluid communication between the gas block and the bolt carrier group (BCG) 116 in the upper receiver. When the cartridge is loaded into the chamber and is discharged to produce a combustion gas 144 and a spent shell 142, the combustion gas from the discharged blank cartridge propels the propulsion assembly forward. A portion of the combustion gas 144' travels through the gas port, the gas block, and the gas tube to the BCG and forces the BCG backwards away from the chamber. The backwards movement of the BCG ejects the spent shell. The BCG is biased forward in the upper receiver by a spring, and as the BCG moves forward back to its ready position, it loads another one of the blank cartridges 140*b* from a magazine 130 in the lower receiver.

Generally, the present invention provides a breaching tool 10 in which the barrel is the primary structure that constrains the translation of the propulsion assembly and the ramming head along the longitudinal axis of the barrel's bore. By itself, the barrel's bore constrains the propulsion assembly's translation by constraining the axial movement of the pushpin. However, the barrel's bore does not constrain the propulsion assembly's maximum axial translation ($AT_{max}$). The maximum axial translation is constrained by a shaft collar 14 that is attached to the distal end of the barrel and which engages the compression spring's distal end 28*a* as the spring can is forced forward with the propulsion assembly. The shaft collar also functions in combination with the barrel's outer surface and handguard's internal sidewall to provide constraints on deviations from the axial movement of the spring can. At the back edge 26*e* of the spring can's cylindrical housing 26*a*, a base ring 26*c* surrounds and slides over the exterior surface of the barrel and engages the compression spring's proximal end 28*b*, and the spring can's interior sidewall surrounds and slides over the shaft collar's outward periphery 14*a*. The compression spring maintains a space between the base ring and the shaft collar even when the spring can slides forward by the maximum axial translation, and deviations in the spring can's axial movement are limited by the tolerances between the spring can's base ring sliding over the barrel's exterior surface and the spring can's interior sidewall sliding over the shaft collar. The spring can's exterior diameter is concentric to and slides within the handguard's internal diameter, and when the spring can slides forward by the maximum axial translation, the back edge of the spring can remains within the handguard which also limits deviations in the spring can's axial movement. The components in the breaching tool, the semiautomatic breaching gun, and some ramming heads and their operations are described in detail below.

Receivers & Magazine

The breaching tool can be adapted to attach to the standard upper receiver and lower receiver of a semiautomatic rifle, such as an AR-15 style rifle, which may be attached with a barrel nut. The design of the barrel can be optimized for the particular receivers of the semiautomatic rifle or can be based on receivers that are customized for the breaching tool. In the preferred embodiment, the upper receiver 110 is made from steel and has side flanges 112 that slide over the opposite external sides 122 of the lower receiver 120 which are also made from steel. The female upper receiver that mates with the male lower receiver is opposite from the standard receiver configuration in which the upper receiver has internal posts that fit into apertures between the sides of the lower receiver. The standard internal posts are not designed to withstand the forces generated by the breaching tool and transferred back to the receivers through the barrel and are susceptible to shearing because of these forces. The side flanges provide additional strength to the connection between the receivers and are designed to withstand the forces generated by the breaching tool.

The upper receiver has standard a threaded front end 114 for the barrel nut and the same tolerances for a standard bolt carrier group (BCG) 116 and charging handle 150. The upper portion of the magazine well in the upper receiver has a protrusion 118 that prohibits a standard magazine with live rounds from being fully inserted. The sidewalls of the lower receiver slide between the side flanges in the upper receiver, and takedown pins 58 extend through apertures in the receivers that are aligned with each other to connect the receivers. It will be appreciated that different sizes of takedown pins can be used without departing from the present invention (e.g., ¼", 5⁄16", ⅜", etc.). The lower receiver preferably uses a standard trigger assembly, grip, safety, magazine release and bolt catch. The lower receiver preferably uses a modified buffer catch pin. The magazine's top section is preferably modified from a standard magazine to have a notch 132 that allows it to be fully inserted past the protrusion in the upper receiver to engage with the BCG in the upper receiver. The magazine also has an added strip 134 along the front inside sidewall 136 to match the shorter length of the blank cartridges 140 and to also prevent the accidental loading of live rounds in the modified magazine.

The breaching tool can also be resized to work with different sizes of receivers. For example, receivers sized like an AR-10 style semiautomatic rifle would provide more power to the breaching tool and could be used with a larger size breaching tool. Standard engineering can be used to size the breaching tool and the breaching gun, taking into account the "Goldilocks Principle" that there is a balance between sizing components when considering adjustments in the amount of black powder grain in the shell, the travel length of the ramming head, and the spring force. Additionally, as discussed in detail below with regard to the barrel, adjustments to the location of a gas port 30 and a gas block 32 should also be considered. Regardless of whether the breaching gun uses standard receivers or the customized receivers described above, the operation of the gas system to eject a spent shell and load a fresh shell is important. The gas port's placement is optimized to get the gas back to the BCG with enough pressure to function properly. Additionally, regardless of the size of the breaching tool and breaching gun, fully automatic operation is not recommended because it would likely result in a misfire of the breaching gun and significantly reduce the operational life of the breaching tool and could destroy the breaching gun and/or the breaching tool.

Barrel & Chamber

The barrel is mounted to the front end of the upper receiver with a barrel nut 38 that has internal threads which screw onto the upper receiver's barrel threads. The barrel extends along a longitudinal axis 12*c* from its proximal side 12*a* that is connected to the upper receiver by the barrel nut to its distal side 12*b*. The barrel is preferably made of 4340 chromoly with a heavy wall thickness and has an equally strong shaft collar 14 fixedly attached to the end of the barrel, such as with a threaded connection, a welded connection, or a fastener connection. The shaft collar extends radially outward from the outer side of the barrel to an outward periphery 14*a* at an outward diameter ($OD_{SC}$). The barrel's smooth bore 12*d* (i.e. the barrel's inner sidewall) is preferably drilled in the material so the inner diameter of the barrel's bore (ID B) is less than half the outer diameter of the barrel's outer surface 12*e* ($OD_B$), i.e., $ID_B$<½ *$ODB_B$, resulting in a bore diameter that is less than the barrel's sidewall thickness ($ST_B$), i.e., $ID_B<ST_B$. For example, for an AR-15 style breaching tool, $ID_B$ would be less than half an inch (approximately 0.442") while $OD_B$ would be approximately one inch (1" to 1.065") so $ST_B$ would be greater than half an inch (0.558" to 0.623"). The drill bit is preferably sized to provide the tight tolerance (0.005") between the bore and both the pushpin and the piston. The chromoly material withstands the friction of the piston and the pushpin and provides enough strength to hold the shaft collar and the maximum spring force applied to it by the compression spring when the spring can slides forward by the maximum axial translation ($AT_{max}$) so the compression spring reaches its maximum compressed state ($CS_{max}$). The barrel is preferably sixteen inches (16") long to comply with government regulations (ATF) for manufacturing a rifle-styled breaching tool. Without regard to the ATF regulations, the barrel could be shortened by approximately two inches (2") to reduce the length and weight of the breaching tool.

The barrel is similar to a standard AR-15 style rifle, but it has a larger bore and different location of the gas port 30 in the barrel's wall. These attributes help contain the pressures and prevent the compression spring from breaking free of the barrel when it is fully compressed. The stiffness of the barrel is sufficient to prevent bending of the pushpin and the barrel as the pushpin is propelled axially forward in the barrel's bore, and the ramming head strikes the surface to be forced open. As explained in more detail below, the tight tolerances between the barrel's bore ($ID_B$) and the pushpin's outermost diameter ($OD_P$) keep the propulsion assembly, the spring can, and the ramming head axially aligned as they are propelled forward to the extended position.

The barrel also includes a chamber 42 at its proximal side and a throat 44 extending between the chamber and the bore, and the bore side of the throat 48 preferably has a tapered seat 46. To build maximum pressure, the chamber is preferably kept as small as possible. To prevent the user from accidentally loading a live round bullet and discharging it against the piston, there is a small tolerance of approximately 0.015" between the forwardmost end of the blank cartridge in the throat and the rearward end 16*a* of the propulsion assembly backing up against the tapered seat. A live round is approximately 0.030" longer than the blank cartridge so the live round will not fit within the shortened chamber of the breaching tool which prevents accidental discharge of a live round by the breaching gun. In particular, the rearward end of the propulsion assembly will interfere with the projectile portion of the round extending through the throat which would prevent the live round from being seated within the chamber thereby preventing the BCG from locking so the firing mechanism will not discharge the live round that cannot be chambered.

The gas port extends fully through the barrel's wall, from the barrel's bore to the barrel's outer surface. The gas port is located rearward of the spring can's base ring in the ready position and in the extended position. Also, the gas port's location is preferably forward of the propulsion assembly's rearward end when the propulsion assembly is in the extended position. The gas port location and diameter are important to ensure correct cycling of the BCG and to prevent damage or destruction of the BCG. If the gas port's location is too close to the BCG or its diameter is too large, the pressure of the explosion may throw the BCG back so hard that it will break the upper receiver. If the gas port's location is too far away or its diameter is too small, it may not cycle the BCG to eject the spent shell and load the next cartridge in the magazine.

Gas Block & Gas Tube

The gas port is in fluid communication with the BCG through a gas block 32 that is attached to the barrel over the gas port 30 and a gas tube 34 that extends between the gas block and the BCG. The gas block is preferably fastened to the barrel's outer surface over the gas port with one or more set screws 66 or other fasteners, and is in fluid communication with the gas port, and the gas tube is in fluid communication between the gas block and the BCG. The gas block and the gas tube are preferably located within the internal diameter of the handguard which is preferably fastened to the gas block.

Depending on the size and configuration of the barrel nut, the gas tube can either extend over the exterior side of the barrel nut or can extend through one of a series of holes in the barrel nut. To machine the length, roll pin location, and entry port, a straight gas tube is preferably used. Accordingly, to accommodate a straight gas tube in the breaching tool, the gas block is larger than a standard gas block that is used in many semiautomatic rifles. It will be appreciated that the gas port and gas tube could be modified in a manner that is similar to the standard style for semiautomatic rifles. The larger gas block also provides additional support for the handguard.

In a production version of the breaching tool, the gas tube and gas block could be made more lightweight with a different material and shape, and instead of using a roll pin to connect them, they could be welded together in the standard style for semiautomatic rifles. By using a gas tube with a bend in the middle, the gas block could also be reduced in size. It will also be appreciated that the roll pin could be perpendicular to the current configuration, and the breaching tool could also be redesigned to use a piston-style gas system.

Propulsion Assembly

As indicated above, the breaching tool's propulsion assembly the propulsion assembly has a pushpin 18 that is slidingly contained within the barrel's bore and may also include a piston in the barrel's bore between the back end of the pushpin and the chamber for the blank cartridge, one or more o-rings 50 around the pushpin 18 and piston 20, and a pushpin plate between the front end of the pushpin and the ramming head. Generally, the propulsion assembly translates within the bore along the longitudinal axis between the ready position (RP) and the extended position (EP). The pushpin 18 is preferably a solid rod with an outermost diameter ($OD_P$) and has a back section 18*a* with a flat face 18*c* at its back end and a front section 18*b* with a chamfer 18*d* around the circumference of its front end. The front end of the pushpin is proximate to the distal side of the barrel in the ready position (RP) and translates forward from the distal side of the barrel in the extended position (EP). The rearward end of propulsion assembly is in contact with the proximal side of the barrel in the ready position and translates forward from the proximal side of the barrel in the extended position, and a maximum axial translation ($AT_{max}$) of the propulsion assembly relative to the barrel is greater than approximately three (3) times the outer diameter of the barrel's outer surface and is less than approximately ten (10) times the outer diameter of the barrel's outer surface ($3*OD_B \lesssim AT_{max} \lesssim 10*OD_B$) and is preferably less than approximately seven (7) times the outer diameter of the barrel's outer surface ($AT_{max} \lesssim 7*OD_B$).

Since the pushpin is the smallest diameter part that translates relative to the barrel, and its front section is propelled forward from the barrel's distal end, it is the most likely part to bend. The tight tolerance between the pushpin's outermost diameter and the barrel's inner sidewall is important to keeping the pushpin axially aligned with the longitudinal axis of the barrel as the pushpin translates forward to the extended position. Additionally, as indicated above, the cooperative relationships between the moving components in the breaching tool provide additional structural support that help keep the entire propulsion assembly axially aligned with the longitudinal axis of the barrel. In particular, tight tolerances between the barrel's outer diameter ($OD_B$) and the base ring's inner edge diameter ($IED_{BR}$) at the spring can's rear portion form a support guide's rearward portion for the propulsion assembly's pushpin. The tight tolerance between the shaft collar's outward diameter ($OD_{SC}$) and the spring can's interior diameter ($ID_{SC}$) form a support guide's forward portion for the pushpin. The support guide for the pushpin is strengthened by the close concentric tolerances between the spring can's exterior diameter ($ED_{SC}$) as it slides within the handguard's internal diameter ($ID_H$). Preferably, the spring can's exterior sidewall does not touch the handguard's internal sidewall so the primary guide to the axial translation of the propulsion assembly outside the barrel is produced by the spring can's interior sidewall sliding on the shaft collar's outward periphery 14*a* and the base ring's inner edge 26*f* sliding on the barrel's exterior surface. Accordingly, when the propulsion assembly, the spring assembly, and the ramming head are propelled forward, their components are kept axially aligned by the tight tolerances.

The pushpin and piston each has an outer diameter ($OD_P$) that is slightly smaller than the inner diameter of the bore ($ID_B$). For example, for an $OD_P$ of (0.437", approximately 7/16"), the barrel is drilled to approximately 0.442" so it is oversized by a 0.005" tolerance ($t_{B-P}$). Generally, the outermost diameter of the pushpin and the piston ($OD_P$) is preferably smaller than the bore's inner diameter by a tolerance that is on the order of magnitude of and may be approximately equal to one hundredth the bore's inner diameter ($t_{P-B} \approx 1/100*ID_P$, i.e., $0.005 \neq 0.0044$ for the size example provided herein). The tight tolerance between the pushpin and the bore (and between the piston and the bore) is less than one hundredth the outer diameter of the barrel's outer surface ($T<1/100*OD_B$, i.e., $0.005<0.01$ for the size example provided herein). Generally, the tight tolerance between the bore and the propulsion assembly's pushpin and piston is much less than the inner diameter of the bore ($t_{B-P} \ll ID_B$) and is very much less than the outer diameter of the barrel's outer surface ($t_{B-P} \lll OD_B$).

The propulsion assembly's forward end 16*b* also preferably includes a pushpin plate which is located at the front edge of the spring can. The pushpin plate preferably has a chamfered recess 22*b* at its center 22*a* which matches chamfer at the pushpin's front end. The front end of the pushpin maintains an open space 52 between the distal side of the barrel and the pushpin plate when the propulsion assembly is in the ready position preventing the pushpin plate from contacting the distal side of the barrel, and the compression spring forces the propulsion assembly backward until its rearward end contacts the barrel's proximal side. The pushpin plate is in a substantially fixed position relative to the spring can. The pushpin plate can be formed as a circular disc that is located within the interior diameter of the spring can's cylindrical housing at its front edge and/or it could be in front of and contact the front edge and may have bolt holes aligned with the bolt holes in the spring can's flange and the threaded holes in the ramming head. Preferably, the spring can's flange has four (4) bolt holes 60 that are equidistant from each other and are located between the spring can's cylindrical housing and the flange's periphery.

The pushpin plate is preferably a circular disk with an outer diameter ($OD_{PP}$=1.85") that is slightly smaller than the spring can's interior diameter ($ID_{SC}$=1.875") so the pushpin plate snugly fits within the spring can but is not constrained from slightly moving within the spring can. In this configuration in which the pushpin plate is not attached to the spring can, the pushpin plate engages the corresponding portion of the ramming head's mounting plate and does not contact portions of the ramming head extending radially outside the bolt holes. Therefore, in this configuration, the spring can's flange is pulled forward by its connection to the ramming head, not pushed forward by the propulsion assembly because the combustion force is transmitted through the piston and pushpin to the pushpin plate which pushes the ramming head forward, and a portion of the combustion force is transmitted back from the ramming head to pull the spring assembly forward. Similarly, when the ramming head strikes the surface to be forced open, the impact force is transmitted from the ramming head back to the propulsion assembly through the pushpin plate and to the spring can through the flange, and the compression spring then pushes the spring can's base ring back from the shaft collar to put the spring assembly back into the ready position. It will be appreciated that the mounting plate for the ramming head could serve as the pushpin plate in which case the spring can's flange would also be pulled forward by the ramming head. Although it is possible for the pushpin plate to be formed as a part of the spring can's flange, this would result in the combustion force being transmitted directly to the flange from the propulsion assembly so the flange is pushed forward rather than being pulled forward by the ramming head.

The piston 20 is preferably identical to the pushpin 18 as a mirror image, with the chamfer **20*d* around its proximal end 20*a* and the flat face 20*c* at its distal end 20*b*. The piston is slidingly contained within the barrel's bore between the back end of the pushpin and the bore side of the throat. The flat faces of the pushpin and the piston mate against each other. Accordingly, the pushpin is preferably at the forward end of the propulsion assembly, and the piston forms the rearward end of the propulsion assembly. The pushpin and piston each preferably have a circumferential groove 18*e*, 20*e* to hold the o-ring's inside portion 50*a*. The o-ring's outside portion 50*b*** extends out from the circumferential groove and contacts the bore. The chamfer in the proximal end of the piston corresponds to and is in contact with the barrel's tapered seat in the ready position. The chamfers in the piston, the pushpin, and the pushpin plate's recess are preferably thirty degrees (30°) relative to a plane that is perpendicular to the longitudinal axis of the parts. Similarly, the taper in the tapered seat is also preferably thirty degrees (30°). The chamfer in the piston's proximal end and in the tapered seat on the bore side of the throat helps prevent the piston from mushrooming when it is forced back to its ready position in the barrel's bore by the compression spring. If the piston mushrooms, it could result in an interference between the piston and the bore's inner sidewall, resulting in friction and eventually failure of the breaching tool. The barrel's tapered seat is the primary component that is impacted from the force of the return spring which returns the translating components of the breaching tool to the ready position, and the surface area of the chamfer spreads out the force while the angle of the chamfer directs the force inward toward the center of the piston which reduces the potential for mushrooming as compared to a piston that has a flat faced proximal end. The compression spring remains partially compressed in its expanded state (ES) even when the spring assembly, pushpin, and piston are in their ready position so the compression spring pushes the pushpin and piston face tight against the barrel's tapered seat to create the higher compression. Accordingly, the chamfer also helps to seal the throat for the initial explosion of the cartridge. Without the chamfer, it is possible for gas to more easily escape around the piston.

The piston may be slid into the barrel's bore with a lubricant that will not deteriorate when subjected to high temperatures and pressures within the barrel, and the pushpin engages a pushpin plate. Preferably, the distal end of the bore has a slight taper **12*f* of approximately fifteen degrees (15°) which helps to seat the o-rings 50** within the bore and slide within the bore's inner sidewalls. Although the pushpin could be fixedly connected to the pushpin plate, such as with a threaded distal end that is screwed into a threaded bore, the distal end of the pushpin preferably has the chamfer that mates with the chamfered recess at the center of the pushpin plate.

Although the piston could be integrally formed as the rear portion of the pushpin, for manufacturing, assembly, maintenance purposes, it is preferred to fabricate the piston separately from the pushpin. Accordingly, the piston and pushpin are preferably made separately to help with tolerances, cost, and ease of manufacturing. If the pushpin is made with the piston as a single part, the tolerance may need to be tighter which could increase the cost of the part, and there could be more risk of excessive wear. The pushpin and piston may be made from A2 tool steel that is hardened to keep from mushrooming and seizing inside the barrel. The metallurgy could be a different material, but A2 is a good candidate because it is cost effective, easy to obtain, easy to work with, easy to heat treat, and the tolerance can be more easily maintained as well.

Spring Assembly & Handguard

As generally described above, the spring assembly includes the helical compression spring and the spring can. The compression spring surrounds a distal portion of the barrel within the spring can, and the spring can slides axially along the barrel around the compression spring, translating with the propulsion assembly relative to the barrel. The spring can's length (8.75") is shorter than the barrel's length by nearly a half, and the front edge of the spring can and the spring can's flange are positioned a small distance 56 in front of the end of the barrel's distal side and the back edge of the spring can is preferably spaced ahead of the gas block so in the ready position, the spring can surrounds the barrel's distal end and most or all of the barrel's distal half but does not surround much if any of the barrel's proximal half. As indicated above, the shaft collar is fixedly attached to the distal end of the barrel so the compression spring is held between the shaft collar's inner face **14*b*** and the spring can's base ring. After each breaching action, the compression spring biases the ramming head, propulsion assembly, and spring can back to their ready position.

The spring can's flange extends radially outward from the cylindrical housing, and the base ring extends radially inward from the cylindrical housing. The flange and the base ring are welded to or otherwise fixedly attached to the cylindrical housing proximate to its front edge and back edge, respectively. In the ready position, the flange is spaced forward of the barrel's distal side by a minimum distance that is less than the exterior diameter of the spring can's cylindrical housing ($ED_{SC}$) which is two inches (2") for the size of the exemplary breaching tool described herein. The flange translates further forward to its maximum distance from the barrel's distal side when the propulsion assembly reaches its maximum axial translation. As indicated above, the cylindrical housing's interior diameter is slidingly engaged with the shaft collar's outward periphery, and the base ring's inner edge is slidingly engaged with the outer diameter of the barrel's outer surface.

Since the forces exerted by the compression spring on the spring can are significantly less than the combustion forces and impact forces, the sidewall thickness of the spring can's cylindrical housing ($ST_{SC}$=0.0625" to 0.065") can be much thinner than the barrel's heavy sidewall thickness ($ST_B$=0.623"). In the particular size example provided herein, the sidewall thickness of the spring can's cylindrical housing is an order of magnitude less than the barrel's heavy sidewall thickness $ST_{SC} \lessapprox 0.1*ST_B$). Generally, the sidewall thickness of the spring can's cylindrical housing can be much less than the barrel's heavy sidewall thickness ($ST_{SC} \ll ST_B$). The base ring's inner edge diameter ($IED_{BR}$) is slightly greater than the one inch (1") outer diameter of the barrel's outer surface ($OD_B$). The thickness of the flange and the base ring ($T_{BR}$, $T_F$=0.25") is greater than the thickness of the cylindrical housing's sidewall but do not need to be as thick as the barrel ($ST_{SC} < T_{BR}$, $T_F < ST_B$).

As indicated above, there is a tight tolerance between the shaft collar's outward diameter ($OD_{SC}$) and the spring can's interior diameter ($ID_{SC}$). Generally, the interior diameter of the spring can's cylindrical housing ($ID_{SC}$) is greater than the shaft collar's outward diameter ($OD_{SC}$) by a tolerance ($t_{SC\text{-}SC}$) that is less than or approximately equal to the sidewall thickness of the cylindrical housing ($t_{SC\text{-}SC} \lesssim ST_{SC}$) and is preferably less than or approximately equal to the small tolerance of the pushpin plate's outer diameter ($OD_{PP}$) within the spring can's interior diameter ($ID_{SC}$). The inner edge of the spring can's base ring has a diameter ($IED_{BR}$) that is greater than the outer diameter of the barrel's outer surface ($OD_B$) by substantially the same tolerance as the spring can with respect to the shaft collar ($IED_{BR} > OD_B$, $t_{BR\text{-}OS} \approx t_{SC\text{-}SC}$).

The handguard 36 is substantially cylindrical extending twelve inches (12") from a back rim 36*a* to a front rim 36*b*. The handguard's length is shorter than the barrel's length but is preferably longer than the spring can's length ($L_{SC} < L_H < L_B$) so that it is long enough to cover the back end of the spring can in both the ready position and the extended position which prevents any open space between the spring can and the handguard. The handguard overlapping the spring can with a close tolerance between the concentric sidewalls keeps the operator of the breaching tool safe from accidentally getting their hand or any other body part trapped between the spring can and handguard while using the breaching tool. The handguard also protects the user from the barrel's heat resulting from the hot gas generated within the barrel by repeatedly using blank cartridges to actuate the breaching tool's propulsion assembly.

The handguard is preferably mounted to the upper receiver and/or the barrel and extends past the proximal half of the barrel to the distal half of the barrel. The handguard can be mounted to the barrel through the barrel nut, and for a smaller diameter barrel nut 38 that does not radially extend beyond the gas tube, a spacer 40 can be positioned between the barrel nut and handguard. The spacer is fastened to the handguard, such as with a button head bolt 68. When the handguard is threadingly attached to the outside diameter of a barrel nut, the handguard's internal threads are screwed onto the threads on the barrel nut's exterior sidewall which mounts the barrel to front end of the semi-automatic's upper receiver. A set screw 66 has its head on the handguard's external diameter ($ED_H$) and its threaded shank extends through the handguard's sidewall to at least one of the upper receiver and the barrel nut. The handguard also covers the gas block and the gas tube, and another set screw has its head on the handguard's external diameter ($ED_H$) and its threaded shank extends through both the handguard's sidewall and the gas block to the barrel's outer surface. Accordingly, it will be appreciated that the handguard is in a fixed location relative to the barrel and does not move with the spring assembly and the propulsion assembly. Instead, as indicated above, the spring can's exterior diameter ($ED_{SC}$) is concentric with and slides within the internal diameter of the handguard as it remains in its static position relative to the barrel, and the spring can's back edge remains within the handguard's internal diameter ($ID_{SC}$) at a location 54 rearward of the handguard's front rim when the spring can translates forward with the propulsion assembly to the extended position.

For the size of the exemplary breaching tool described herein, the handguard's internal diameter ($ID_H$) is 2.0625" which is greater than the spring can's exterior diameter ($ED_{SC}$) by a tolerance is equivalent to the tolerance of the spring can with respect to the shaft collar ($ID_H > ED_{SC}$, $t_{H\text{-}SC} \cong t_{SC\text{-}SC}$). Since the handguard does not move with the spring assembly and the propulsion assembly relative to the barrel, it experiences significantly lower forces that these other parts of the breaching tool. Accordingly, the handguard can be made from aluminum to reduce the overall weight of the breaching tool, and its sidewall thickness of 5/32" (approximately 0.156") results in an external diameter ($ED_H$) of 2.375".

A single handle may be attached to the handguard or to another portion of the firearm that does not reciprocate when the breaching tool is operated, such as in U.S. Pat. No. 10,946,222. Similarly, one or more pair of handles can be attached to opposite sides of the handguard, such as in U.S. Pat. No. 8,342,069. In some instances, handles may be counterproductive and could be dangerous so if handles are used, they preferably can be removed or folded inwards from their perpendicular position to be aligned with the handguard with parallel longitudinal axes.

The compression spring has a free length that is slightly greater than the internal space in the spring can between the base ring and the pushpin plate in the ready position to ensure that the compression spring forces the propulsion assembly's rearward end back into contact with the bore side of the barrel's throat in the ready position. The compression of the compression spring within the spring can in the ready position also prevents the compression spring from rattling between the base ring and the shaft collar. Generally, the spring weight is chosen to prevent the explosion of the blank cartridge from shock loading the shaft collar and its threads that connect it to the threaded end of the barrel. Preferably, the compression spring is stiff enough to not bottom out when the blank cartridge is discharged and is flexible enough to allow the propulsion assembly and the spring can to extend to a maximum axial translation that is approximately half the length of the compression spring. The balance between the spring's stiffness and flexibility is also important to prevent a failure in the shaft collar's connection to the barrel's distal side when the breaching tool is dry fired.

For the size of the exemplary breaching tool described herein, the compression spring's free length is eight inches (8") and has a compressed length ($L_{SC}$) of approximately half its free length (3.78") in its compressed state (CS). As indicated above, the compression spring remains partially compressed in its expanded state (ES) so its expanded length ($L_{SE}$) is slightly less than the free length. It will be appreciated that the propulsion assembly's maximum axial translation ($AT_{max}$) is the difference between the compression spring's expanded length and its compressed length ($AT_{max}=L_{SE}-L_{SC}$). The compression spring's outside diameter ($OD_{CS}$) is 1.795" and its inside diameter ($ID_{CS}$) is approximately one inch (1") so it fits snugly over the barrel's outer surface without being restricted from its compression and expansion within the spring can. Generally, the compression spring's inside diameter (IDs) is equivalent to or slightly greater than the outer diameter of the barrel's outer surface ($OD_B$), and the outermost diameter of the piston and the pushpin ($OD_P$) is less than the compression spring's inside diameter ($OD_P<ID_{CS}$). The compression spring is preferably coated with oil-tempered chrome silicon has a spring weight of 666 pounds.

Ramming Heads

There are many different ramming heads that could be used with the breaching tool, and three (3) exemplary ramming heads are shown in FIGS. 5A-5C and are described in more detail below. Each one of the ramming heads 300 attaches to the distal end of the breaching tool in the same manner. The ramming head has a mounting plate 70 with threaded bolt holes 62 at its four (4) corners which correspond with location of the four (4) bolt holes 60 in the spring can's flange so four (4) bolts 64 can extend through the spring can's flange into the mounting plate's threaded bolt holes. The bolts screw into the threaded bolt holes to hold the ramming head onto the spring can's flange. The spring can's flange and the ramming heads' mounting plates are designed with a four-(4) bolt pattern to ensure that the components are screwed tightly enough to withstand the jolting nature of the breaching action. Two (2) bolts may suffice, but the four (4) bolt design ensures safety. It will be appreciated that any type of secure connection between the spring can's flange and the ramming head can be used, such as a ramming head with a quick detach mechanism.

The ramming heads can have a standard shape, such as the box-shaped blunt ramming head 300*a* as shown in FIG. 5A, or the triangular-shaped sharp ramming head with a single point 300*b* as shown in FIG. 5B. Different shaped ramming heads can be used for particular breaching operations. For example, the blunt ramming head is not well suited for breaking through hurricane glass. Instead, to break through hurricane glass, it is preferred to have multiple points and sharp edges angled back from the point(s) such as the innovative ramming head 300*c* shown in FIG. 5C.

According to another aspect of the present invention, the multiple point ramming head is used for breaching hurricane glass and preferably has five (5) points. The center pin 302 sticks out longer than the other four (4) points at the corners of the ramming head. The center pin concentrates all of the force from the breaching action and focuses it on the impact zone to break the first pane of tempered glass. The center pin preferably has a threaded proximal end 306 that screws into a threaded hole that is either in the head or in the mounting plate so the center pin is removable in case that it breaks or is damaged, such snapping off as being bent or otherwise deformed. The center pin's distal end preferably includes a carbide insert which is harder than steel and is also more brittle than steel. Because of its brittleness, the carbide insert is replaceable in case it is damaged and needs to be replaced. The other four (4) points preferably have the same carbide insert. Once the first and second panes of glass are cracked, the gel has to be cut to create a hole for entry. In the edges between the four (4) points, the sidewalls V-shaped and are sharpened like the edge of a knife. With every impact of the breaching tool, the knife-edge cuts through the gel that is in the center of multiple panes of hurricane glass.

It will be appreciated that the present inventive ramming head with five (5) projections (points) with a longer center pin provides a significant benefit over ramming head which only have four (4) points equal length points such as disclosed in US Pat. App. Pub. No. 2021/0101030, especially in the breaking of hurricane glass. The four-point ramming heads are much less effective than the inventive ramming head because the equal length points spread out the ramming head's force over all of the pins whereas the longer center pin concentrates the ramming head's impact force in the initial strike on the surface to be forced open and then follows the initial strike with the four-points against the already weakened glass structure.

The ramming head of the present invention preferably has two (2) angles per side. The ramming head has long tapering insert holders with long tapering carbide inserts to cut through the membrane, and there is no flat portion that may become caught during breaching in between the carbide points. Every section of the head is a long taper to slide through the membrane.

It will be appreciated that the for alternative ramming heads that do not have the same pattern of four (4) bolts as in the spring can's flange (alternative ramming heads not shown), the mounting plate can be an adapter which has mounting holes corresponding with the pattern in the ramming head. Each of the mounting holes would have a bolt head section and a smaller diameter shoulder section which would allow the threaded shanks of the bolts to extend through the shoulder section of the mounting holes while the head engages the shoulder section, thereby attaching the mounting plate to the ramming head with bolts whose heads are recessed in the head section of each of the mounting holes. The mounting plate would have threaded holes at the locations corresponding with the bolt holes in the spring can's flange so the four (4) bolts can secure the mounting plate and its attached ramming head to the flange.

Shock Absorbing Shoulder Stock

The shock absorbing shoulder stock assembly 200 is important to the safety of the operator and includes a recoil spring 202 in a spring tube 204 and also preferably includes a resilient pad 206 and a bolt chamber 208 attached to opposite sides of a pad plate 210. The spring tube is connected to the back end of the buffer tube 212 which contains a buffer spring 214 and a buffer 216. The buffer spring is compressed by the BCG when the breaching tool is discharged and returns the BCG to its firing position when the breaching tool is in its ready state. The recoil spring in the spring tube provides additional travel for the buffer tube within the spring tube, preferably at least approximately half the maximum axial translation of the propulsion assembly, spring assembly, and ramming head, i.e., two inches (2") for the breaching tool described above. The spring tube slidingly fits over a distal end 212*a* of the buffer tube, and the buffer tube's additional travel reduces the initial jolt of the recoil produced by the discharge of the blank cartridge and disperses the shock of the recoil through the recoil spring.

The recoil spring's weight is preferably light enough to absorb the shock over the full travel distance of the buffer tube within the spring tube and should be stiff enough that the buffer tube does not bottom out at the back end of the spring tube. Generally, the recoil spring, the buffer tube, and the spring tube are in a stasis position when the recoil spring is extended and a buffering position when the recoil spring is compressed. The spring tube's back end is attached to the pad plate's front side 210*a*. The head 224*a* of a shoulder bolt 224 keeps the pad plate and spring tube slidingly connected to the buffer tube by sliding the shoulder bolt through the pad plate and bolt chamber and screwing its threaded end 224*b* into a bolt keeper 218 which is connected to the buffer tube by a jam nut 220 and bracket 222. The shoulder pad is preferably made of a resilient material and is attached to the back side 210*b* of the pad plate with two (2) screws or other fasteners. The pad also helps disperse some of the recoil shock and is much more resilient than the steel pad plate to which it is fastened.

Breaching Tool Operation

To operate the breaching tool 10, a blank cartridge is chambered in the barrel, and when the user pulls the breaching gun's trigger, the blank cartridge discharges and propels the propulsion assembly, spring assembly, and ramming head forward from the ready position (RP) to the extended position (EP). The breaching tool uses the force of the high pressure generated in the breaching gun's chamber at one end of the barrel to propel the piston and pushpin forward and actuate the breaching action. As the piston moves forward, the spring can that is attached to the propulsion assembly moves with it, and the compression spring that is contained inside the spring can compresses with the movement until it is compressed to approximately half of its full length. Once the tool expends the energy from the combustion chamber, the compressed spring returns the ramming head and propulsion assembly back to the ready position.

In the ready position, the pushpin and piston force the pushpin plate slightly forward of the barrel's distal end with the shaft collar to provide a slight gap between the pushpin plate and the shaft collar so the compression spring presses the piston's chamfered proximal end firmly against the corresponding tapered seat at the bore side of the throat at the rear of the barrel. The pressure between the piston's chamfered proximal end and the barrel's tapered rear end creates a seal to keep the gases from escaping at the point of discharge. The force of the high pressure generated in the chamber at the proximal end of the barrel propels the piston and pushpin forward in the barrel from their ready position to an extended position which forces the spring assembly and ramming head forward to the extended position. The compression spring is encased between the spring can's interior sidewall and the barrel's exterior sidewall, and its ends are held between the spring can's rear end and the fixed shaft collar. As the spring can moves forward, the compression spring is compressed between the spring can's rear end and the shaft collar which increases the spring force. The energy from the discharged cartridge increases the increased pressure and temperature in the barrel's bore which results in a force that propels the propulsion assembly, spring assembly, and ramming head forward. As these components of the breaching tool are propelled forward, some of the energy from the discharged cartridge is converted into potential energy as the compression spring is being compressed while some energy is lost as pressure escapes out of the barrel around the piston and the pushpin in the tolerances with the barrel's bore and other energy is transferred through the gas port, the gas block, and the gas tube back to operate the BCG in cycling to eject the spent cartridge and load the next blank cartridge in the barrel's chamber. When the potential energy in the compressed spring exceeds the remaining energy from the discharged cartridge and momentum of the propulsion assembly, spring assembly, and ramming head, the compression spring begins to expand from its compressed state and returns the pushpin, piston, and ramming head back to the ready position so that the breaching tool can again be actuated with the new blank cartridge that is loaded in the chamber.

The spring force is preferably balanced with the blank cartridge being used so that the discharge of the blank cartridge causes the compression spring to be compressed within the spring can by more than one-quarter (¼) of the spring's fully extended length to approximately one-half (½) of its fully expanded length and is stiff enough to not bottom out. There is a balance between the spring constant, the barrel pressure, and the strength of the shaft collar at the end of the barrel. If a spring and the shaft collar are too weak, the propelling force of the expanding gas in the barrel could cause the entire spring assembly and ramming head to break free and shoot forward away from the barrel. In comparison, for an extremely stiff spring and secure shaft collar, the pressure might not have sufficient force to overcome the spring force and fully compress the compression spring within the spring can in which case the pushpin would not be forced forward to its full extension and the force transmitted the ramming head would be significantly reduced. Preferably, full compression of the compression spring produces a force that is lower than the maximum force generated by the expanding gas, and the shaft collar can sustain a force that is less than the full propulsive force that it would receive without any spring and is greater than a force it would receive from an extremely stiff spring that would only be compressed by one-quarter (¼) or one-third (⅓) of the compression spring's fully extended length so that the blank cartridge only compresses the compression spring to three-quarters (¾) or two-thirds (⅔) of the compression spring's fully extended length, respectively.

There is also a balance to the size and the location of the gas port according to standard engineering techniques and the "Goldilocks Principle" which can optimize for the correct pressure: too much pressure through the gas tube could damage the BCG while too little pressure would fail to dispel the shell of a discharged cartridge and load a new blank cartridge. If the gas port is too close to the combustion chamber, the pressure back to the BCG would be too high. If the gas port is too far away from the combustion chamber, there could be enough pressure to force the carrier initially back from the locked bolt, but there may not be enough inertia to forces the BCG all the way back to expel the discharged shell and reload the next round from the magazine. Additionally, the gas port should be sized properly so that it is large enough to provide sufficient pressure back to the BCG and should not be so large that it siphons off too much pressure from the primary propulsive action of the piston and pushpin. Note also that if the tool is adapted to a larger breaching gun, such as an AR-10 sized breaching gun as compared to an AR-15 sized breaching gun, the Goldilocks theory would have to be reconfigured to the amount of black powder grain in the shell, travel length of the head, spring force, and other factors.

When breaching some structures, such as hurricane glass, the material will have a lot of give and just the initial shock of the ramming head is not enough. Also, when the material is hurricane glass, the ramming head is designed to breach through a gel layer. Therefore, the breaching tool preferably provides for a few inches of travel before the spring force is strong enough to return the pushpin, spring assembly, and ramming head back to their ready position. This spring permits maximum axial translation of approximately four inches (4") which allows the ramming head to plunge through hurricane glass gel and use the sharpened edge to cut through the gel like a knife. With regard to the five (5) point ramming head disclosed above for hurricane glass, the longer center concentrates the entirety of the ramming head's force, initially breaking the glass and weakening the glass structure. With the glass structure being weakened, the remaining four (4) points at the corners can more easily break through the glass and the internal gel, and knife edges between the corners can cut through the glass and gel.

The present breaching tool does not require a separate ram housing around the ramming head, a snubber, or a piston at the back end of the return spring within the barrel. In comparison, U.S. Pat. No. 10,946,222 discloses a barrel that requires these additional features, and the return spring must be contained within the internal surface of the ’222 Patent’s barrel. A larger diameter barrel as in the ’222 Patent and many of the prior art references which have the breaching tool’s return spring and a piston that is larger than the return spring within the barrel’s bore (rather than having the spring outside the barrel around the barrel’s outer surface with a piston that has a diameter that is smaller than the diameter of the spring as in the present invention) may provide more bending and torsional (twisting) stiffness and structural support as compared to the smaller diameter barrel bore in the breaching tool disclosed in US Pat. App. Pub. No. 2013/0160342 which only has the pushpin within the small diameter bore of the barrel and a pair of guide rods that are only partly constrained with semicircular openings in the base portion which makes. However, in addition to constraining the pushpin in the bore barrel, the present invention also uses the tight tolerances outside of the barrel’s bore to constrain the longitudinal translation of the spring can and help prevent the ramming head from diverting from the longitudinal axis of the barrel. In particular, the tight tolerances between shaft collar on the front of the barrel relative to the spring can’s interior sidewall, between the barrel’s outer surface relative to the spring can’s base ring, and between the handguard’s internal sidewall and the spring can’s outer sidewall all serve to function as guides to maintain alignment with the barrel bore’s longitudinal axis for the axial translation of the propulsion assembly, the spring assembly, and the ramming head. Accordingly, rather than having a larger diameter barrel as in the ’222 Patent and many of the prior art references which have the return spring and the larger diameter piston within the barrel’s bore, the spring can helps prevent bending of the pushpin and provides torsional (twisting) stiffness and structural support as compared to the less constrained breaching tool in the ’342 application.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, many of the breaching tool’s components could be designed to be 3D printed and/or made with carbon fiber or similar composite materials to save on weight. Additionally, although firearm rounds are the currently the most efficient way to create the pressure that forces the pushpin and ramming head forward (i.e., approximately 50,000 PSI), the breaching tool of the present invention could operate with a superhigh pressure tank and/or cartridge(s) that provide the pressure without the explosion of a firearm round. Thus, the breadth and scope of the present invention should not be limited by any of the above-described exemplary embodiments, but should be defined only in accordance with the following claims appended hereto and their equivalents.

What is claimed is:

1. A combustion-actuated breaching tool for a semiautomatic breaching gun, comprising:

a barrel extending along a longitudinal axis between a proximal side and a distal side, wherein the barrel comprises a bore and an outer surface, wherein the bore has an inner diameter, and wherein the outer surface has an outer diameter, a shaft collar fixedly attached to the barrel proximate to the distal side, wherein the shaft collar extends radially outward from the outer side of the barrel to an outward periphery at an outward diameter;

a propulsion assembly comprising a pushpin slidingly contained within the barrel’s bore, wherein the pushpin has an outermost diameter and is comprised of a back section with a back end and a front section with a front end, wherein the propulsion assembly translates within the bore along the longitudinal axis between a ready position and an extended position, wherein the front end of the pushpin is proximate to the distal side of the barrel in the ready position and translates forward from the distal side of the barrel in the extended position, wherein a rearward end of the propulsion assembly is in contact with the proximal side of the barrel in the ready position and translates forward from the proximal side of the barrel in the extended position, and wherein a maximum axial translation of the propulsion assembly relative to the barrel is greater than three times the outer diameter of the barrel;

a spring can comprising a cylindrical housing, a flange, and a base ring, wherein the spring can is connected to and translates with the propulsion assembly relative to the barrel, wherein the cylindrical housing has a wall thickness, a front edge, and a back edge, wherein the flange and the base ring are fixedly attached to the cylindrical housing proximate to the front edge and the back edge, respectively, wherein an interior diameter of the cylindrical housing is slidingly engaged with the outward periphery of the shaft collar, and wherein an inner edge of the base ring is slidingly engaged with the barrel’s outer surface; and a compression spring contained within the spring can and helically surrounding the outer surface of the barrel, wherein a first end of the compression spring engages the base ring, wherein a second end of the compression spring engages the shaft collar, wherein the compression spring is in a compressed state when the propulsion assembly is in the extended position and has a first longitudinal length, and wherein the compression spring is biased to an expanded state with a second longitudinal length greater than the first longitudinal length forcing the base ring away from the shaft collar and pushing the propulsion assembly back into the ready position.

2. The breaching tool of claim 1, wherein the propulsion assembly is further comprised of a first o-ring, wherein the outermost diameter of the pushpin is smaller than the bore’s inner diameter by a tolerance less than one hundredth the outer diameter of the barrel’s outer surface, wherein the pushpin is further comprised of a first circumferential groove, wherein an inside portion of the first o-ring is situated within the first circumferential groove, and wherein an outside portion of the first o-ring extends out from the first circumferential groove and contacts the bore.

3. The breaching tool of claim 2, wherein the propulsion assembly is further comprised of a piston and a second o-ring, wherein the piston is slidingly contained within the barrel’s bore, wherein a distal end of the piston is in contact with the back end of the pushpin, wherein a proximal end of the piston forms the rearward end of the propulsion assembly, wherein the piston is further comprised of a second circumferential groove and has substantially the same diameter as the outermost diameter of the pushpin, and wherein a first portion of the second o-ring is situated within the second circumferential groove and a second portion of the second o-ring extends out from the second circumferential groove and contacts the bore.

4. The breaching tool of claim 3, wherein the barrel is further comprised of a chamber at the proximal side, a throat extending between the chamber and the bore, and a tapered seat at a bore side of the throat, wherein the pushpin and the piston each have solid interior portions, wherein the proximal end of the piston has a first chamfer corresponding to and in contact with the tapered seat of the barrel, wherein the distal end of the piston has a first flat face, wherein the back end of the pushpin has a second flat face mating against the first flat face of the piston, and wherein the front end of the pushpin has a second chamfer.

5. The breaching tool of claim 1, wherein the outermost diameter of the pushpin is less than an inside diameter of the compression spring, wherein a forward end of the propulsion assembly is comprised of a pushpin plate positioned proximate to the front edge of the spring can, wherein the pushpin plate is comprised of a chamfered recess at a center of the pushpin plate, wherein the front end of the pushpin has a chamfer corresponding to and in contact with the chamfered recess, and wherein the front end of the pushpin maintains an open space between the distal side of the barrel and the pushpin plate when the propulsion assembly is in the ready position preventing the pushpin plate from contacting the distal side of the barrel and causing the spring to force the rearward end of the propulsion assembly backward to contact the proximal side of the barrel in the ready position.

6. The breaching tool of claim 1, further comprising a gas block, a gas tube, a bolt carrier group in an upper receiver, and a handguard, wherein the barrel is further comprised of a gas port that is forward of the propulsion assembly's rearward end when the propulsion assembly is in the extended position and is rearward of the spring can's base ring in the ready position and in the extended position, wherein the gas block is fastened to the barrel's outer surface over the gas port and is in fluid communication with the gas port, wherein the gas tube is in fluid communication between the gas block and the bolt carrier group, wherein the handguard is fixedly mounted to at least one of the barrel and the upper receiver, wherein the handguard is substantially cylindrical with an internal diameter and an external diameter and extends from a back rim to a front rim, and wherein the gas block and the gas tube are located within the internal diameter of the handguard.

7. The breaching tool of claim 6, wherein the interior diameter of the spring can's cylindrical housing is greater than the outward diameter of the shaft collar by a tolerance less than the wall thickness of the cylindrical housing, wherein the inner edge of the spring can's base ring has an inner edge diameter greater than the outer diameter of the barrel's outer surface by substantially the same tolerance, wherein an exterior diameter of the spring can is concentric with and slides within the internal diameter of the handguard, wherein the back edge of the spring can remains within the internal diameter of the handguard at a location rearward of the front rim when the spring can translates forward with the propulsion assembly to the extended position, and wherein the maximum axial translation of the propulsion assembly relative to the barrel is less than seven times the outer diameter of the barrel.

8. The breaching tool of claim 6, further comprising a lower receiver and a magazine containing a plurality of blank cartridges, wherein the bolt carrier group is biased forward within the upper receiver, wherein the upper receiver has a threaded front end, wherein the barrel further comprises a barrel nut screwed onto the threaded front end of the upper receiver and connecting the barrel to the upper receiver, wherein the handguard is fastened to a spacer located between the handguard and the barrel nut and surrounding the barrel nut, wherein the upper receiver is mounted to the lower receiver, wherein the magazine is removably secured to the lower magazine, wherein the barrel is further comprised of a chamber at the proximal side, wherein one of the blank cartridges is loaded into the chamber and is discharged to produce a combustion gas and a spent shell, wherein the combustion gas from the discharged blank cartridge propels the propulsion assembly forward, wherein a portion of the combustion gas travels through the gas port, the gas block, and the gas tube to the bolt carrier group and forces the bolt carrier group backwards away from the chamber, wherein the backwards movement of the bolt carrier group ejects the spent shell, wherein the bolt carrier group loads another one of the blank cartridges from the magazine as the bolt carrier group is biased forward in the upper receiver.

9. The breaching tool of claim 1, further comprising a ramming head, an upper receiver, a lower receiver, and a shoulder stock assembly, wherein the ramming head is removably connected to the flange of the spring can, wherein the spring can's flange is spaced a first distance forward of the barrel's distal side in the ready position and translates to a second distance greater than the first distance when the propulsion assembly is at the maximum axial translation in the extended position, wherein the proximal side of the barrel is connected to the upper receiver, wherein the upper receiver is mounted to the lower receiver, and wherein the shoulder stock assembly is attached to the lower receiver opposite from the barrel.

10. The breaching tool of claim 9, wherein the shoulder stock assembly comprises a buffer tube, a buffer spring within the buffer tube, a spring tube slidingly fitted over a distal end of the buffer tube, a recoil spring within the spring tube, a jam nut attached to the buffer tube, a bolt chamber mounted to the spring tube, a bolt keeper attached to the jam nut with a shoulder bolt slidingly constrained within the bolt chamber, a pad plate attached to the spring tube and the bolt chamber on its front side, and a pad fastened to the back side of the pad plate, and wherein a plurality of side flanges extending from the upper receiver slide over and are fastened to opposite external sides of the lower receiver.

11. A combustion-actuated breaching tool for a semiautomatic breaching gun, comprising:

a barrel extending along a longitudinal axis between a proximal side and a distal side, wherein the barrel comprises a bore and an outer surface, wherein the bore has an inner diameter, and wherein the outer surface has an outer diameter, a shaft collar fixedly attached to the barrel proximate to the distal side, wherein the shaft collar extends radially outward from the outer side of the barrel to an outward periphery at an outward diameter;

a propulsion assembly comprising a pushpin slidingly contained within the barrel's bore, wherein the pushpin has an outermost diameter and is comprised of a back section with a back end and a front section with a front end, wherein the propulsion assembly translates within the bore along the longitudinal axis between a ready position and an extended position, wherein the front end of the pushpin is proximate to the distal side of the barrel in the ready position and translates forward from the distal side of the barrel in the extended position, and wherein a rearward end of propulsion assembly is proximate to the proximal side of the barrel in the ready position and translates forward from the proximal side of the barrel in the extended position;

a spring can comprising a cylindrical housing, a flange, and a base ring, wherein the spring can is connected to and translates with the propulsion assembly relative to the barrel, wherein the cylindrical housing has a wall thickness, a front edge, and a back edge, wherein the flange and the base ring are fixedly attached to the cylindrical housing proximate to the front edge and the back edge, respectively, wherein an interior diameter of the cylindrical housing is slidingly engaged with the outward periphery of the shaft collar, and wherein an inner edge of the base ring is slidingly engaged with the barrel's outer surface;

a compression spring contained within the spring can and helically surrounding the outer surface of the barrel, wherein a first end of the compression spring engages the base ring, wherein a second end of the compression spring engages the shaft collar, wherein the compression spring is in a compressed state when the propulsion assembly is in the extended position and has a first longitudinal length, and wherein the compression spring is biased to an expanded state with a second longitudinal length greater than the first longitudinal length forcing the base ring away from the shaft collar and pushing the propulsion assembly back into the ready position; and a handguard fixedly mounted to the barrel, wherein the handguard is substantially cylindrical with an internal diameter and an external diameter and extends from a back rim to a front rim, wherein an exterior diameter of the spring can is concentric with and slides within the internal diameter of the handguard, and wherein the back edge of the spring can remains within the internal diameter of the handguard at a location rearward of the front rim when the spring can translates forward with the propulsion assembly to the extended position.

12. The breaching tool of claim 11, wherein a maximum axial translation of the propulsion assembly relative to the barrel is greater than three times the outer diameter of the barrel and less than seven times the outer diameter of the barrel, wherein the outermost diameter of the pushpin is smaller than an inside diameter of the compression spring and is smaller than the bore's inner diameter by a first tolerance less than one hundredth the outer diameter of the barrel's outer surface, wherein an interior diameter of the spring can's cylindrical housing is greater than the outward diameter of the shaft collar by a second tolerance less than the wall thickness of the cylindrical housing, and wherein the inner edge of the spring can's base ring has an inner edge diameter greater than the outer diameter of the barrel's outer surface by the second tolerance.

13. The breaching tool of claim 11, wherein the propulsion assembly is further comprised of a piston and a pushpin plate, wherein the piston is slidingly contained within the barrel's bore, wherein a distal end of the piston is in contact with the back end of the pushpin, wherein a proximal end of the piston forms the rearward end of the propulsion assembly, and wherein the pushpin plate is positioned proximate to the front edge of the spring can.

14. The breaching tool of claim 13, wherein the pushpin plate is further comprised of a chamfered recess at a center of the pushpin plate, wherein the pushpin's front end has a first chamfer corresponding to and in contact with the chamfered recess, wherein the barrel is further comprised of a chamber at the proximal side, a throat extending between the chamber and the bore, and a tapered seat at a bore side of the throat, wherein the piston's proximal end has a second chamfer corresponding to the tapered seat of the barrel, wherein the back end of the pushpin has a first flat face, wherein the distal end of the piston has a second flat face mating against the first flat face of the pushpin, and wherein the pushpin's front end maintains an open space between the barrel's distal side and the pushpin plate when the propulsion assembly is in the ready position preventing the pushpin plate from contacting the barrel's distal side and causing the spring to force the pushpin and piston backward in the ready position until the second chamfer at the piston's proximal end contacts the tapered seat in the barrel's bore.

15. The breaching tool of claim 11, further comprising a gas block, a gas tube, a bolt carrier group, an upper receiver, and a lower receiver, wherein the bolt carrier group is biased forward within the upper receiver, wherein the upper receiver has a threaded front end, wherein the barrel further comprises a barrel nut screwed onto the threaded front end of the upper receiver and connecting the barrel to the upper receiver, wherein the upper receiver is mounted to the lower receiver, wherein the barrel is further comprised of a gas port that is forward of the propulsion assembly's rearward end when the propulsion assembly is in the extended position and is rearward of the spring can's base ring in the ready position and in the extended position, wherein the gas block is fastened to the barrel's outer surface over the gas port and is in fluid communication with the gas port, wherein the gas tube is in fluid communication between the gas block and the bolt carrier group, and wherein the gas block and the gas tube are located within the internal diameter of the handguard.

16. A combustion-actuated breaching tool for a semiautomatic breaching gun, comprising:

a barrel extending along a longitudinal axis between a proximal side and a distal side, wherein the barrel comprises a bore, an outer surface, and a gas port between the bore and the outer surface, wherein the bore has an inner diameter, and wherein the outer surface has an outer diameter, a shaft collar fixedly attached to the barrel proximate to the distal side, wherein the shaft collar extends radially outward from the outer side of the barrel to an outward periphery at an outward diameter;

a propulsion assembly comprising a pushpin slidingly contained within the barrel's bore, wherein the pushpin has an outermost diameter and is comprised of a back section with a back end and a front section with a front end, wherein the propulsion assembly translates within the bore along the longitudinal axis between a ready position and an extended position, wherein the front end of the pushpin is proximate to the distal side of the barrel in the ready position and translates forward from the distal side of the barrel in the extended position, and wherein a rearward end of propulsion assembly is proximate to the proximal side of the barrel in the ready position and translates forward from the proximal side of the barrel in the extended position;

a spring can comprising a cylindrical housing, a flange, and a base ring, wherein the spring can is connected to and translates with the propulsion assembly relative to the barrel, wherein the cylindrical housing has a wall thickness, a front edge, and a back edge, wherein the flange and the base ring are fixedly attached to the cylindrical housing proximate to the front edge and the back edge, respectively, wherein an interior diameter of the cylindrical housing is slidingly engaged with the outward periphery of the shaft collar, and wherein an inner edge of the base ring is slidingly engaged with the outer diameter of the barrel's outer surface;

a compression spring contained within the spring can and helically surrounding the outer surface of the barrel, wherein a first end of the compression spring engages the base ring, wherein a second end of the compression spring engages the shaft collar, wherein the compression spring is in a compressed state when the propulsion assembly is in the extended position and has a first longitudinal length, and wherein the compression spring is biased to an expanded state with a second longitudinal length greater than the first longitudinal length forcing the base ring away from the shaft collar and pushing the propulsion assembly back into the ready position;

a gas block fastened to the barrel's outer surface over the barrel's gas port, wherein the gas block is in fluid communication with the gas port, and wherein the gas port and the gas block are rearward of the spring can's base ring in the ready position and in the extended position; and a handguard fixedly mounted to the barrel, wherein the handguard is substantially cylindrical with an internal diameter and an external diameter and extends from a back rim to a front rim, wherein the gas block is located within the internal diameter of the handguard, wherein an exterior diameter of the spring can is concentric with and slides within the internal diameter of the handguard, and wherein the back edge of the spring can remains within the internal diameter of the handguard at a location rearward of the front rim when the spring can translates forward with the propulsion assembly to the extended position.

17. The breaching tool of claim 16, wherein a maximum axial translation of the propulsion assembly relative to the barrel is greater than three times the outer diameter of the barrel and less than seven times the outer diameter of the barrel, wherein the outermost diameter of the pushpin is smaller than the bore's inner diameter by a first tolerance less than one hundredth the outer diameter of the barrel's outer surface, wherein an interior diameter of the spring can's cylindrical housing is greater than the outward diameter of the shaft collar by a second tolerance less than the wall thickness of the cylindrical housing, and wherein the inner edge of the spring can's base ring has an inner edge diameter greater than the outer diameter of the barrel's outer surface by the second tolerance.

18. The breaching tool of claim 16, wherein the outermost diameter of the pushpin is less than an inside diameter of the compression spring, wherein the propulsion assembly is further comprised of a piston and a pushpin plate, wherein the piston is slidingly contained within the barrel's bore, wherein a distal end of the piston is in contact with the back end of the pushpin, wherein a proximal end of the piston forms the rearward end of the propulsion assembly, wherein the pushpin plate is positioned proximate to the front edge of the spring can, wherein the barrel's gas port is forward of the propulsion assembly's rearward end when the propulsion assembly is in the extended position, and wherein the spring can's flange is positioned a first distance forward of the barrel's distal side in the ready position.

19. The breaching tool of claim 18, wherein the barrel is further comprised of a chamber at the proximal side, a throat extending between the chamber and the bore, and a tapered seat at a bore side of the throat, wherein the piston's proximal end has a first chamfer corresponding to the barrel's tapered seat, wherein the piston's distal end has a first flat face, wherein the pushpin's back end has a second flat face mating against the piston's first flat face, wherein the pushpin plate is comprised of a chamfered recess at a center of the pushpin plate, wherein the pushpin's front end has a second chamfer corresponding to and in contact with the chamfered recess, and wherein the pushpin's front end maintains an open space between the barrel's distal side and the pushpin plate when the propulsion assembly is in the ready position preventing the pushpin plate from contacting the barrel's distal side and causing the spring to force the pushpin and piston backward in the ready position until the first chamfer at the piston's proximal end contacts the tapered seat in the barrel's bore.

20. The breaching tool of claim 16, further comprising a gas tube, a bolt carrier group, an upper receiver, and a lower receiver, wherein the bolt carrier group is biased forward within the upper receiver, wherein the upper receiver has a threaded front end, wherein the barrel further comprises a barrel nut screwed onto the threaded front end of the upper receiver and connecting the barrel to the upper receiver, wherein the upper receiver is mounted to the lower receiver, wherein the gas tube is in fluid communication between the gas block and the bolt carrier group, and wherein the gas tube is located within the internal diameter of the handguard.

* * * * *